C. O. LAMBREMONT.
COMBINATION TIRE AND RIM.
APPLICATION FILED JULY 3, 1920.

1,423,435.

Patented July 18, 1922.
3 SHEETS—SHEET 1.

Charles O. Lambremont,
INVENTOR

BY *Victor J. Evans*
ATTORNEY

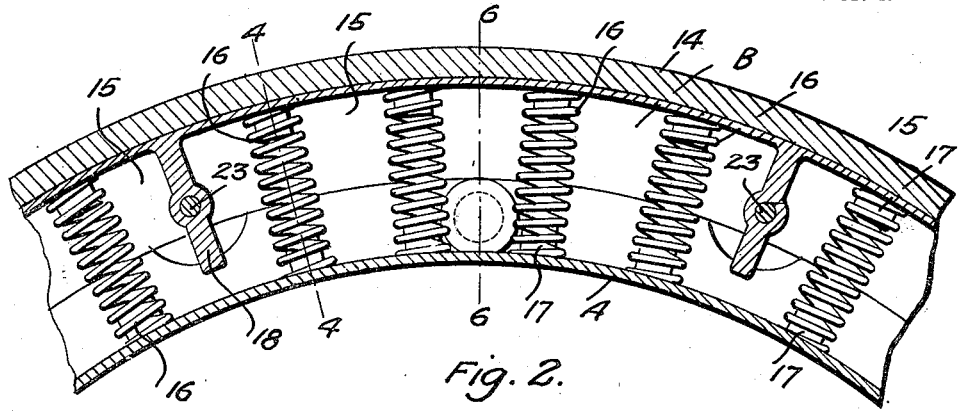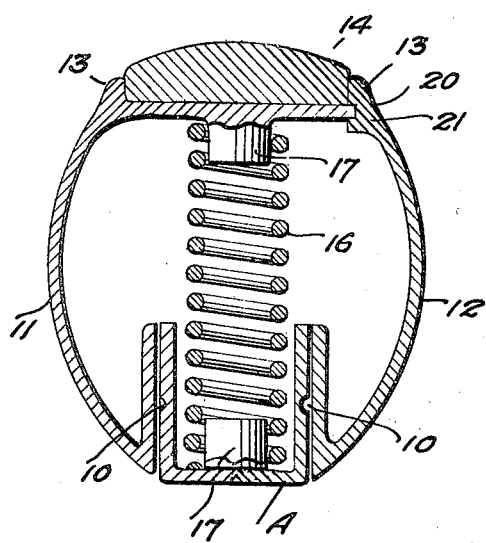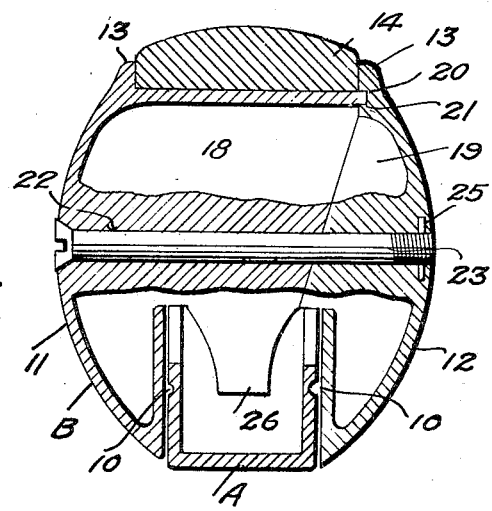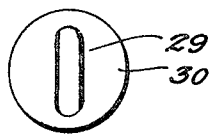

C. O. LAMBREMONT.
COMBINATION TIRE AND RIM.
APPLICATION FILED JULY 3, 1920.
1,423,435.
Patented July 18, 1922.
3 SHEETS—SHEET 3.
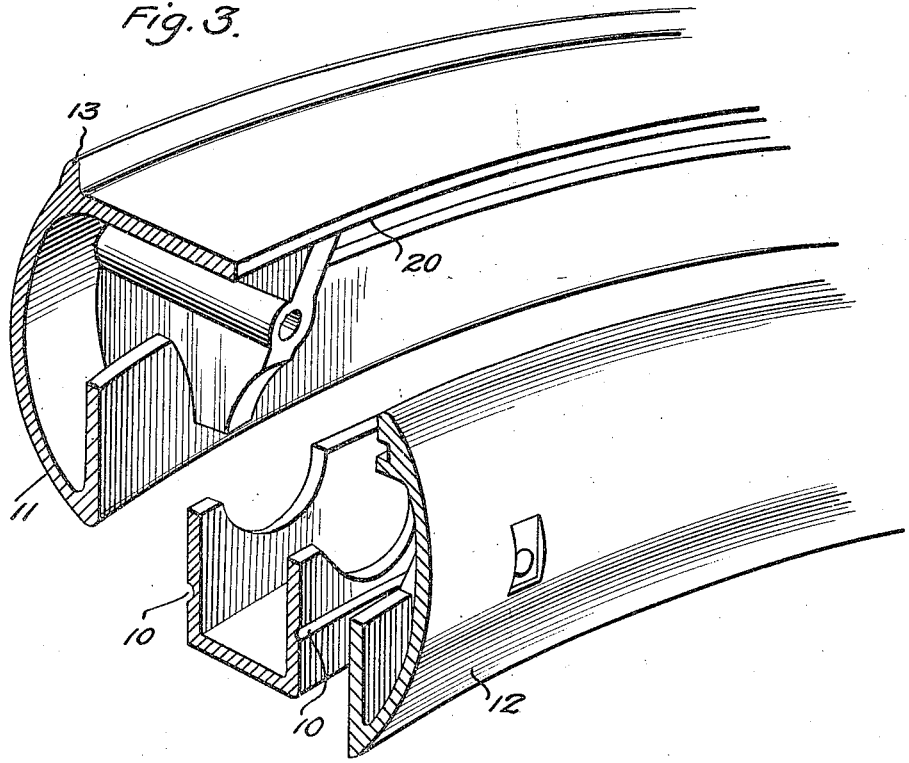
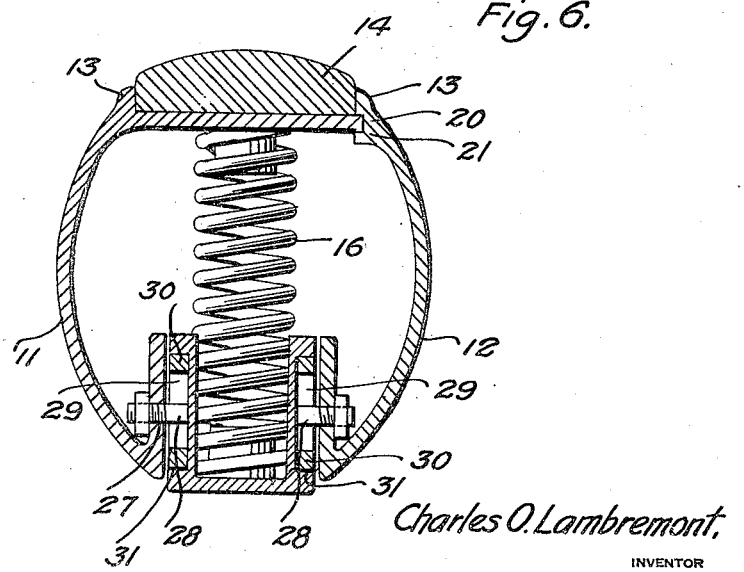
Charles O. Lambremont,
INVENTOR

UNITED STATES PATENT OFFICE.

CHARLES O. LAMBREMONT, OF PLAQUEMINE, LOUISIANA.

COMBINATION TIRE AND RIM.

1,423,435.　　　　　Specification of Letters Patent.　　Patented July 18, 1922.

Application filed July 3, 1920. Serial No. 393,834.

*To all whom it may concern:*

Be it known that I, CHARLES O. LAMBREMONT, a citizen of the United States, residing at Plaquemine, in the parish of Iberville and State of Louisiana, have invented new and useful Improvements in Combination Tires and Rims, of which the following is a specification.

This invention comprehends the provision of a combination tire and rim, wherein the tire except for the tread portion thereof is constructed of metal or any suitable material and yieldably supported upon the rim by means disposed within the tire, and thus housed against the effect of water, dirt and other foreign matter.

Another important object of the invention resides in the novel construction and manner of associating the respective parts, the tire being made in sections to facilitate the association of parts, while the tire is further divided by partitions into separate chambers for the reception of the yieldable means utilized to afford the desired cushioning effect of the wheel.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 2 is a fragmentary longitudinal section.

Figure 3 is a sectional perspective view showing the component parts of the tire and rim separated.

Figure 4 is a transverse sectional view of the tire taken on line 4—4 of Figure 2 showing the same parts associated.

Figure 5 is a sectional view taken on line 5—5 of Figure 1.

Figure 6 is a similar view taken on line 6—6 of Figure 2.

Figure 7 is a detail view of one of the swivel washers.

Figure 1:
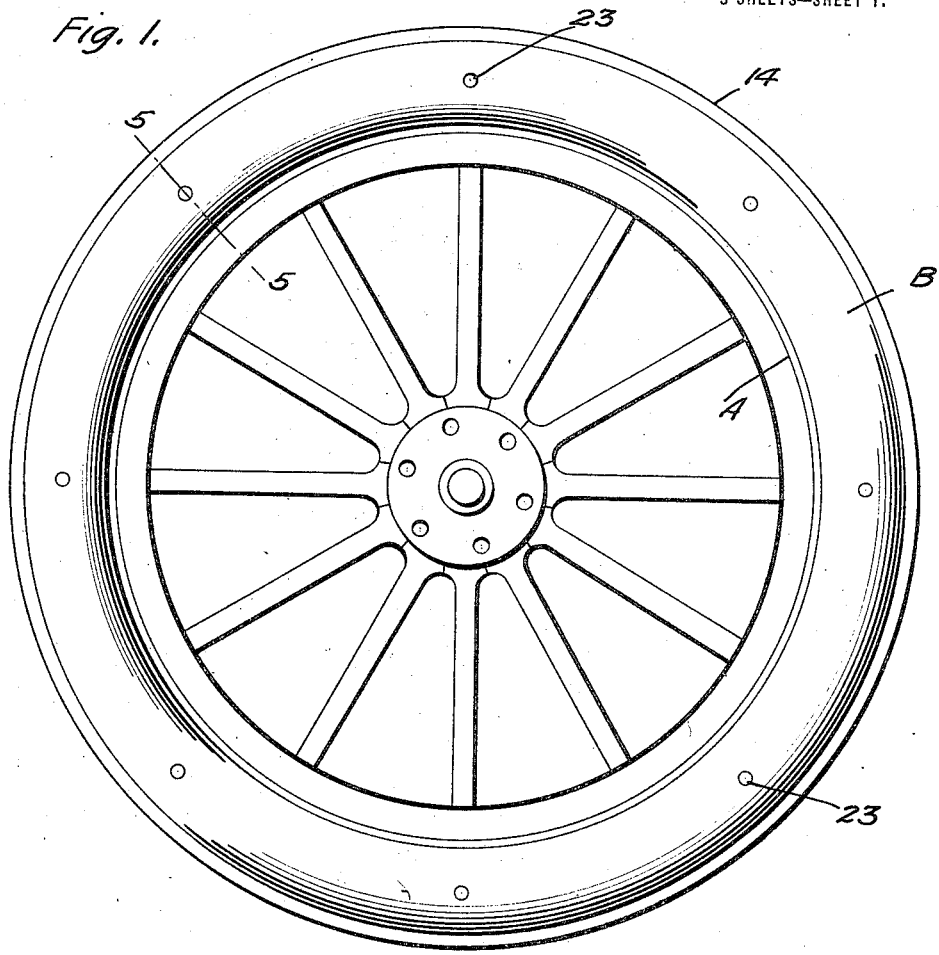
Figure 1 is a side elevation of the combined tire and rim constructed in accordance with my invention.
Figure 8:
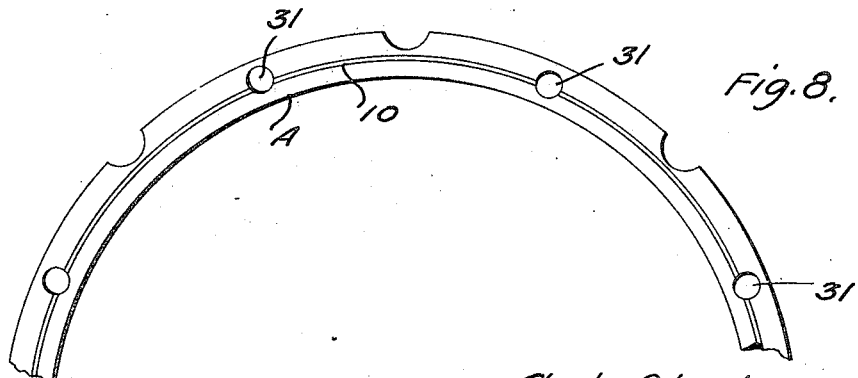
Figure 8 is a fragmentary view of the rim.

Referring to the drawings in detail A indicates generally the rim, the tire designed for association with this rim being indicated generally at B. The rim A is of substantially U-shape formation in cross section and each of the parallel sides is provided with an oil groove 10.

The tire is made up of two sections indicated at 11 and 12 respectively, the sections being constructed from metal or other suitable yieldable material, and these sections are of unequal dimensions, but are of proper cross sectional configuration to unitedly define a tire when the sections are associated, while each section is provided with an annular rib or flange 13. Between these ribs or flanges the tread 14 of rubber or any other suitable material is arranged. Each section is also formed to provide parts of several partitions which when the sections of the tire are associated divide the tire into compartments 15 in which the yieldable means is arranged to afford the tire the proper resiliency. In this specific instance, the yieldable means consists of a plurality of coiled springs 16 which are held in position by means of lugs 17 carried by the tire and rim respectively, there being one of these lugs fitted in each end of the spring as shown.

Those parts of the partitions carried by the section 11 of the tire are comparatively wide with regard to those parts carried by the section 12 of the tire, the wide parts of the partitions being indicated at 18 and the narrow parts at 19. The section 11 is formed with an annular flange 20 upon which the tread portion 14 of the tire reposes, and the edge of this flange 20 is received within a groove 21 formed in the section or member 12. It is of course understood that the tire is mounted to move eccentrically with the wheel. Each portion of the partitions is enlarged at its center and provided with a transverse bore 22, which bores are arranged in alinement when the sections of the tire are associated for the reception of a fastening bolt 23 which is threaded into one section of the tire and has associated therewith a cotter pin or the like 25. Each section 11 and 12 of the tire is provided with an apertured flange 27, the flange of one section being arranged directly opposite the flange of the other section.

The part 18 of the partition is reduced to provide a stop 26 which limits the radial movement of the tire with respect to the rim.

Each flange supports bolts or the like 28 which project an appreciable distance inwardly of the flange. These bolts 28 have their free ends movable within elongated slots 29 of washers 30, the latter being positioned in circular recesses 31 formed in the parallel sides of the rim A. By reason of this construction and arrangement of parts, it will be obvious that the washers are permitted a slight rotatable movement within the recesses to permit of the tire to yield with respect to the rim, but prohibits circumferential movement of the tire with respect to the rim.

The component parts of the combined tire and rim can be readily and easily assembled or disassembled as the occasion may require, and when assembled provides a tire which possesses substantially the same resiliency as a pneumatic tire, and at the same time eliminates the trouble incident to pneumatic tires.

While it is believed that from the foregoing description the nature and advantages of the invention will be readily apparent, I desire to have it understood that I do not limit myself to the details herein shown and described, and that such changes may be resorted to when desired as fall within the scope of what is claimed.

What I claim is:

In combination, a sectional tire, a rim including spaced parallel sides arranged between the tire sections, partitions formed on the tire sections, the partitions of one section being comparatively wide with regard to the partitions of the other section, fastening means passed through said sections for holding the latter operatively associated, said fastening elements being passed through said partitions, certain of said partitions being reduced to form stops, an annular flange formed on each tire section, a tread portion fitted between said flanges, yieldable means interposed betwen the tire and said rim, each side of said rim having recesses, washers fitted in said recesses and having elongated slots, and pins carried by the tire sections and movable within said slots of the washers to provide for an eccentric movement of the tire with regard to the wheel as described.

In testimony whereof I affix my signature.

CHARLES O. LAMBREMONT.